US009782035B2

(12) United States Patent
Perentes et al.

(10) Patent No.: US 9,782,035 B2
(45) Date of Patent: Oct. 10, 2017

(54) BEVERAGE PRODUCTION DEVICE WITH PERFORATING MEANS AND METHOD FOR EXTRACTING A BEVERAGE FROM SUCH DEVICE (71) Applicant: NESTEC S.A., Vevey (CH)

(72) Inventors: Alexandre Perentes, Lausanne (CH); Zbynek Struzka, Montreal (CA)

(73) Assignee: Nestec S.A., Vevey (CH)

( * ) Notice: Subject to any disclaimer, the term of this patent is extended or adjusted under 35 U.S.C. 154(b) by 191 days.

(21) Appl. No.: 14/433,932

(22) PCT Filed: Sep. 24, 2013

(86) PCT No.: PCT/EP2013/069772
§ 371 (c)(1),
(2) Date: Apr. 7, 2015

(87) PCT Pub. No.: WO2014/056716
PCT Pub. Date: Apr. 17, 2014

(65) Prior Publication Data
US 2015/0272379 A1     Oct. 1, 2015

(30) Foreign Application Priority Data
Oct. 9, 2012   (EP) ..................................... 12187724

(51) Int. Cl.
*A47J 31/06* (2006.01)
*A47J 31/44* (2006.01)
(Continued)

(52) U.S. Cl.
CPC ....... *A47J 31/4403* (2013.01); *A47J 31/0673* (2013.01); *A47J 31/22* (2013.01); *B65D 65/466* (2013.01); *B65D 85/8043* (2013.01)

(58) Field of Classification Search
CPC . A47J 31/0673; A47J 31/4403; B65D 65/466; B65D 85/8043
(Continued)

(56) References Cited

U.S. PATENT DOCUMENTS

| 2006/0196364 A1* | 9/2006 | Kirschner | .......... B65D 85/8043 99/295 |
| 2010/0203208 A1* | 8/2010 | Yoakim | ................... A47J 31/22 426/431 |

FOREIGN PATENT DOCUMENTS

| CH | 697407 | 9/2008 |
| WO | 9525457 | 9/1995 |

(Continued)

*Primary Examiner* — Phuong Nguyen
(74) *Attorney, Agent, or Firm* — K&L Gates LLP (57) ABSTRACT The invention relates to a beverage production device for preparing a beverage by means of extracting a food substance contained in a capsule (10), the device comprising capsule enclosing means (29,30) for housing a dedicated capsule (10) within the device, water supply means (25,27, 28,29) for providing liquid to the enclosing means (29,30) and perforating means (20) provided within the enclosing means (29,30) for perforating the capsule (10) in order to produce outlet openings in the capsule for guiding the produced beverage out of the capsule, wherein the perforating means comprise at least two perforating members (20), each of the perforating members (20) comprising a cutting edge (1) formed by two outer cutting surfaces (2,3) joined at the cutting edge, wherein the cutting edge (1) is arranged essentially parallel to a central axis (X) of the enclosing means (29,30).

11 Claims, 4 Drawing Sheets (51) Int. Cl.
*A47J 31/22* (2006.01)
*B65D 85/804* (2006.01)
*B65D 65/46* (2006.01)

(58) Field of Classification Search
USPC ..... 99/295, 287, 281, 288, 285, 302 C, 323, 99/289 R; 426/433, 431, 425, 281, 110, 426/115, 132, 77–80
See application file for complete search history.

(56) References Cited

FOREIGN PATENT DOCUMENTS

| | | |
|---|---|---|
| WO | 2008148646 | 12/2008 |
| WO | 2010066736 | 6/2010 |
| WO | 2010118544 | 10/2010 |

\* cited by examiner

BEVERAGE PRODUCTION DEVICE WITH PERFORATING MEANS AND METHOD FOR EXTRACTING A BEVERAGE FROM SUCH DEVICE

CROSS REFERENCE TO RELATED APPLICATIONS

The present application is a National Stage of International Application No. PCT/EP2013/069772, filed on Sep. 24, 2013, which claims priority to European Patent Application No. 12187724.5, filed on Oct. 9, 2012, the entire contents of which are being incorporated herein by reference.

FIELD OF THE INVENTION

The present invention relates to the field of beverage preparation using capsules by way of centrifugation. More particularly, the invention relates to perforating means for perforating a membrane of a capsule in order to produce outlet openings for guiding a produced beverage out of the capsule.

BACKGROUND OF THE INVENTION

Capsules containing beverage ingredients, which are designed for producing a beverage in a beverage preparation device upon liquid injection into the capsules and by rotating the capsules around a central axis in the device are known in the prior art.

The principle consists in preparing a beverage by passing a liquid through beverage ingredients contained in the capsule using centrifugal forces. Thereby, liquid is usually injected in a central inlet area of the capsule before and/or during rotation of the capsule in order to make the liquid interact with the ingredients in the capsule, thus forming a beverage such as coffee, ground coffee, tea, or the like. The resulting beverage is then allowed to exit the capsule by means of at least one outlet aperture provided at a portion arranged radially outwards with respect to the central inlet area of the capsule.

A centrifugal coffee system employing the above-indicated principle is described in WO2008/148656. The membrane of a dedicated capsule is perforated by an injection member of the beverage preparation device in the central part of the membrane for injection of liquid and is simultaneously perforated in the peripheral part of the membrane by smaller piercing members for extraction of the beverage. In particular, a series of perforating members are present on an interface plate of the beverage machine for interacting with the membrane of the capsule. These perforating members aim at perforating the membrane at several locations of the membrane close to the periphery of the capsule respectively near a flange of the capsule. The created perforations enable the resulting beverage to leave the capsule by effect of the centrifugal pressure due to the high-speed rotation of the capsule in the beverage machine.

The known perforating means are in general pyramidal or conically shaped and provide a relatively low angle of inclination with respect to a longitudinal axis respectively a rotational axis of the respective perforation member. This arrangement of the perforating means however suffers the drawback that the membrane of the capsule will accumulate on the surface of the respective perforating member and will thus negatively affect and eventually even block the flow of beverage between the perforating member and the membrane.

EP 1 339 305 relates to a beverage preparation device comprising an essentially conical perforation means designed for producing inlet openings in a capsule face. Thereby, the conical perforating means and in particular a cutting edge thereof is arranged at an acute angle with respect to a longitudinal axis of a capsule.

Based on the known prior art teachings, it is thus desirable to provide perforating means for a beverage preparation device specifically designed to provide an homogeneously distributed flow of beverage coming out of the capsule and preventing the flow from being blocked by the perforating means, thereby overcoming the above-identified problems.

OBJECT AND SUMMARY OF THE INVENTION

The present invention seeks to address the above-described problems. The invention also aims at other objects and particularly the solution of other problems as will appear in the rest of the present description.

In a first aspect, the invention relates to a beverage production device for preparing a beverage by means of extracting a food substance contained in a capsule, the device comprising capsule enclosing means for housing a dedicated capsule within the device, water supply means for providing liquid to the enclosing means and a plurality of perforating elements provided within the enclosing means for perforating the capsule in order to produce one or more outlet openings for guiding the produced beverage out of the capsule.

The perforating means of the device are preferably protruding from an upper portion of the enclosing means and comprise at least two perforating members, preferably a plurality of perforating members, each of the perforating members comprising a cutting edge being arranged essentially parallel to a central axis of the enclosing means. Thereby, the cutting edge is formed by two outer cutting surfaces joined at the cutting edge.

Preferably, the upper portion of the enclosing member is arranged to rotate around the centre axis (X) for driving the capsule in rotational centrifugation. Furthermore the perforating means are preferably positioned on the upper portion of the enclosing means in offset locations relative to the centre axis.

By "essentially parallel" it is meant that the angle of the cutting edge relative to the angle centre axis is strictly parallel or slightly inclined of an angle lower than 15 degrees, preferably lower than 10 degrees, relative to the centre axis The "central axis" of the enclosing means represents the rotational axis of the enclosing means driving the capsule in rotational movement about an axis passing through the capsule.

Due to such an arrangement of the cutting edge of the perforating members, upon engagement of a capsule within the engaging means of the device, the perforating members are designed to effectively perforate an upper wall, membrane or face of the capsule (in the following referred to as membrane). Thereby, the essentially parallelly arranged cutting edge enables a precise and clean cut of the membrane preventing accumulation of a portion of membrane at said edge. Hence, the resulting aperture or opening within the membrane effectively enables in particular the draining of liquid from the capsule by effect of the capsule being rotated at elevated speed thereby resulting in forces of centrifugation being created at the periphery of the capsule. It is surprisingly found that in absence of a cutting edge or when the cutting edge is inclined of an angle different from the essentially parallel orientation, residue (e.g., chips) of membrane or face is created which tends to adhere to the surfaces of the perforating members thereby blocking the flow of beverage. This phenomenon is accentuated by the pressure in the interior of the capsule applying against the surfaces of the perforating member.

Preferably, the perforating members are arranged such that the cutting edge is directed towards the centre axis of the enclosing means. In particular, the cutting edge forms the closest line of the perforating members to the centre axis. This orientation of the cutting edge towards the centre axis allows reducing the hindering of the flow of beverage exiting the capsule and it provides a more homogeneous distribution of the flow through the cut outlet openings.

The cutting surfaces joining to form the cutting edge of the respective perforating member are preferably planar. This planar configuration associated to the essential parallel orientation of the cutting edge contributes to avoiding the membrane or face of the capsule to easily adhere to the cutting surfaces and negatively hinder the flow. Preferably, the cutting surfaces forming the cutting edge are joined at an angle between 25 and 100°, preferably between 80 and 95°, more preferably between 85 and 92°.

Thereby, the cutting surfaces are extending from a base (proximal) portion of the perforating member to a distal portion thereof.

The perforating member further comprises a displacement portion designed for displacing at least a cut out portion of the membrane of the capsule towards a side of the perforating member essentially opposite of the cutting edge upon contact with the membrane.

Accordingly, the portion of the membrane that is cut out by the cutting edge is moved preferably to the opposite part of the perforating member and thus a blocking of liquid flow through the resulting aperture or opening within the membrane is effectively prevented.

In a preferred embodiment, the perforating member further comprises a collecting portion extending from a base portion of the perforating member to a height smaller than the height to which the cutting edge extends from the base portion.

The collecting portion is preferably formed by a curved outer surface or at least two joint surfaces forming an outwardly convex portion.

The outer surface(s) of the collecting portion preferably encloses an angle of between 2 to 45°, more preferably 5 to 25° with the central axis of the enclosing member.

Thereby, the outer surface of the collecting portion may as well be of circular, ellipsoidal, regular or irregular polygonal shape.

The displacement portion of the perforating member preferably connects a protruding distal portion of the cutting edge with the collecting portion of the perforating member. Thereby, the collecting portion is preferably arranged at a side of the perforating member essentially opposite to the cutting edge.

Due to such an arrangement, any residual material cut out from the membrane of the capsule will be moved towards the essentially opposite side of the cutting edge at which the collecting portion is arranged.

In a preferred arrangement, the displacement portion is a planar surface arranged at an acute angle of between 5 to 60°, preferably between 10 to 45°, more preferably between 15 to 20° relative to the cutting edge and/or the central axis of the enclosing means.

The perforating member further comprises pressure release means extending from the base portion of the perforating member towards the displacement portion.

The pressure release means is preferably at least one recess formed in the outer surface of the collecting portion of the perforating member. The pressure release means extends from the displacement portion to the base of the perforating member.

Accordingly, these means contribute to release the pressure of gas inside the capsule when the capsule is filled with liquid before the extraction commences. Furthermore, these means also help guide the beverage off the capsule between the surface of the perforating member and the cut membrane or face of the capsule by providing an enlarged opening surface area.

The pressure release means can be openly curved such as be semicircular shaped or be an openly polygonal such as openly rectangular shaped when seen in top view.

Further, the pressure release means may be of constant or varying diameter. Particularly, the diameter or width of the pressure release means may continuously decrease or increase from the base portion of the perforating member towards a distal portion and/or towards the displacement portion or surface of the perforating member.

The pressure release means may further be chamfered at the distal portion of the perforating member respectively at the displacement portion or surface.

According to such an arrangement, the transport of liquid from the capsule through the created perforations in the capsule membrane is further enhanced.

Preferably, the perforating members are positioned closer to the periphery of the enclosing member than to the centre axis to provide outlets for the beverage where the centrifugal force is elevated. Thereby, the cutting edge of the respective perforating member is provided at a radial distance from the centre axis of the enclosing member. The perforating members can lie between 2 and 5 cm, more preferably between 2.5 and 4 cm from the central axis.

Preferably, the perforating members are distributed along at least one circular array near the periphery of the enclosing member (or upper portion). The perforating members are thereby arranged to provide outlet openings in the periphery of the membrane where the centrifugal pressure is maximal. Preferably, 8 to 20 perforating members are distributed per array. Preferably one to three arrays are considered. Most preferably, a single circular array of perforating members is provided.

The beverage preparation device respectively the enclosing means of the device are preferably equipped with between 2 and 50, more preferably between 15 and 25 perforating members. The perforating members are preferably distributed regularly in an off-centred arrangement about the centre axis of the enclosing means.

In another aspect, the invention relates to a method for extracting a food substance contained within a capsule in a beverage production device injecting liquid into the capsule at the centre axis of the capsule and perforating the capsule for providing outlet openings in a portion radially outside of a centre axis of the capsule in order to allow a resulting beverage to exit the capsule, wherein perforations are made by cutting out a portion of a face or membrane of the capsule in at least two distinct places by means of perforating members, each perforating member having a cutting edge formed by two joined cutting surfaces and the cutting edge is arranged essentially parallel to the centre axis of the capsule.

Preferably, the cutting edge is directed towards the centre of the capsule.

The invention also relates to the use of a capsule containing at least one food substance, preferably ground coffee, for a beverage production device as aforementioned, preferably a coffee machine wherein the capsule is arranged with a face or membrane adapted to be perforated in the at least two distinct places by means of the perforating members and the face or membrane having a thickness between 20 and 500 microns, preferably between 25 and 120 microns, most preferably between 30 and 60 microns.

The membrane is preferably made of a material chosen amongst: metal such as aluminium or alloy of aluminium, plastics such as polyolefin and/or polyester, cellulose such as paper, edible film, biodegradable polymers derived from starch and/or plants, polysaccharides and combinations thereof.

As a mode, the membrane is an (at least) three-layer composite laminate comprising (from inner side to outer side): polypropylene/aluminium/polyethylene terephthalate (PP/alu/PET) or polyethylene/aluminium/polyethylene terephthalate (PE/alu/PET). In a preferred mode, the membrane is a polypropylene of 5-20 microns, most preferably 10-15 microns/aluminium of 5-40 microns, most preferably 5-10 microns/polyethylene terephthalate of 10 to 50 microns, most preferably 15-30 microns. The aluminium layer can be replaced by a polymeric gas-barrier layer such as EVOH or SiOx.

An advantage is also that the use of a, preferably gastight, capsule with a membrane as aforementioned for the device can positively contribute to providing a formation of outlets by the perforating means. In particular, the choice of these characteristics of the membrane for the beverage production device can also contribute to optimize the outflow of beverage and, by way of consequence, the quality of the resulting beverage, e.g., coffee extract.

The capsule is generally made gastight by gas hermetic sealing of the membrane formed of gastight material onto a body of the capsule also formed of gastight material. The freshness of the substance in the capsule can be consequently prolonged during several weeks or months depending on the gas permeability of the materials used in addition to reducing the oxygen level in the interior of the capsule such as by saturating the free space with an inert gas such as carbon dioxide and/or nitrogen before the hermetic sealing of the capsule, The invention also relates to a system comprising the beverage production device and the capsule as taken in combination.

A "biodegradable polymer" is meant to be a polymer that is biodegradable under aerobic conditions according to ISO14855:1999 or anaerobic conditions under ISO15985.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIGS. 5a to 5c are schematic top views of preferred embodiments of a perforating member.

FIG. 6 is a sectional side view of the perforating member according to FIG. 5a.

DETAILED DESCRIPTION OF THE FIGURES

Figure 1:
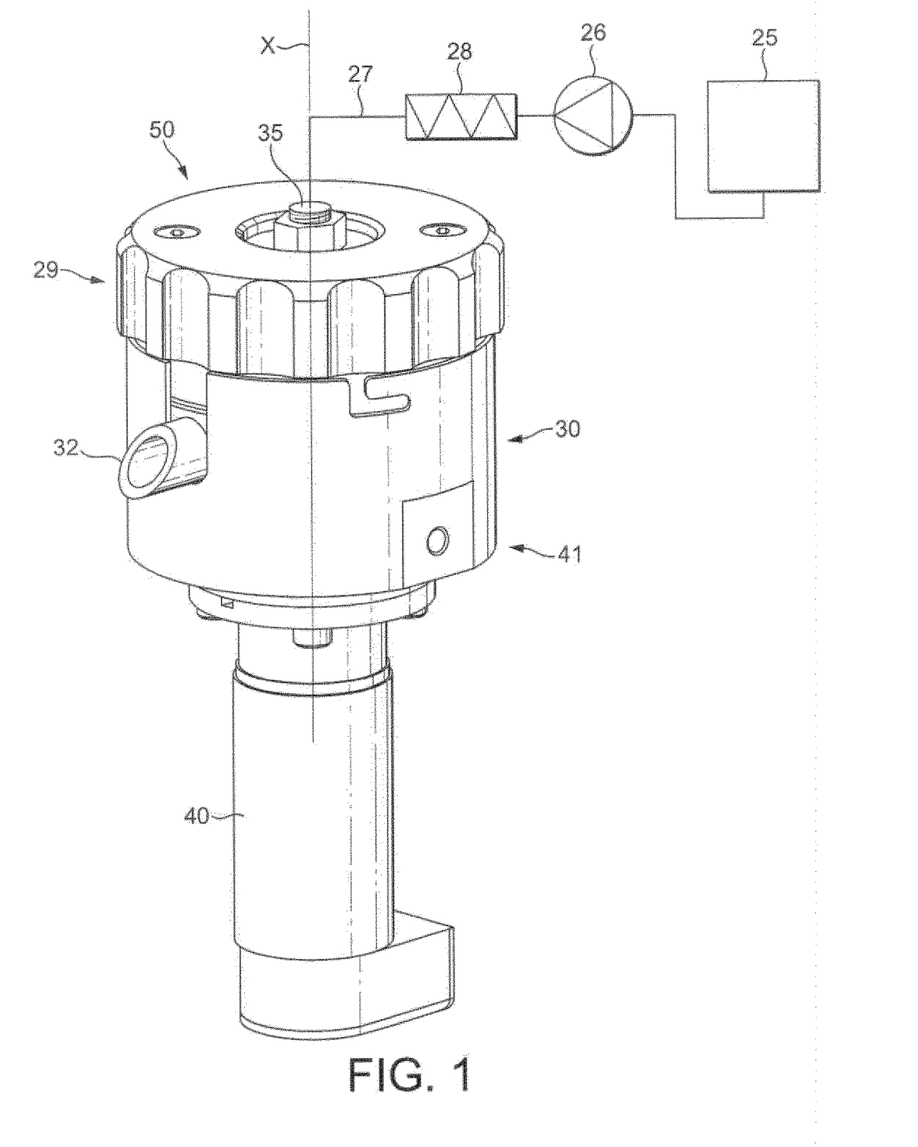
FIG. 1 is a schematic drawing of the beverage preparation device according to the invention.
Figure 2:
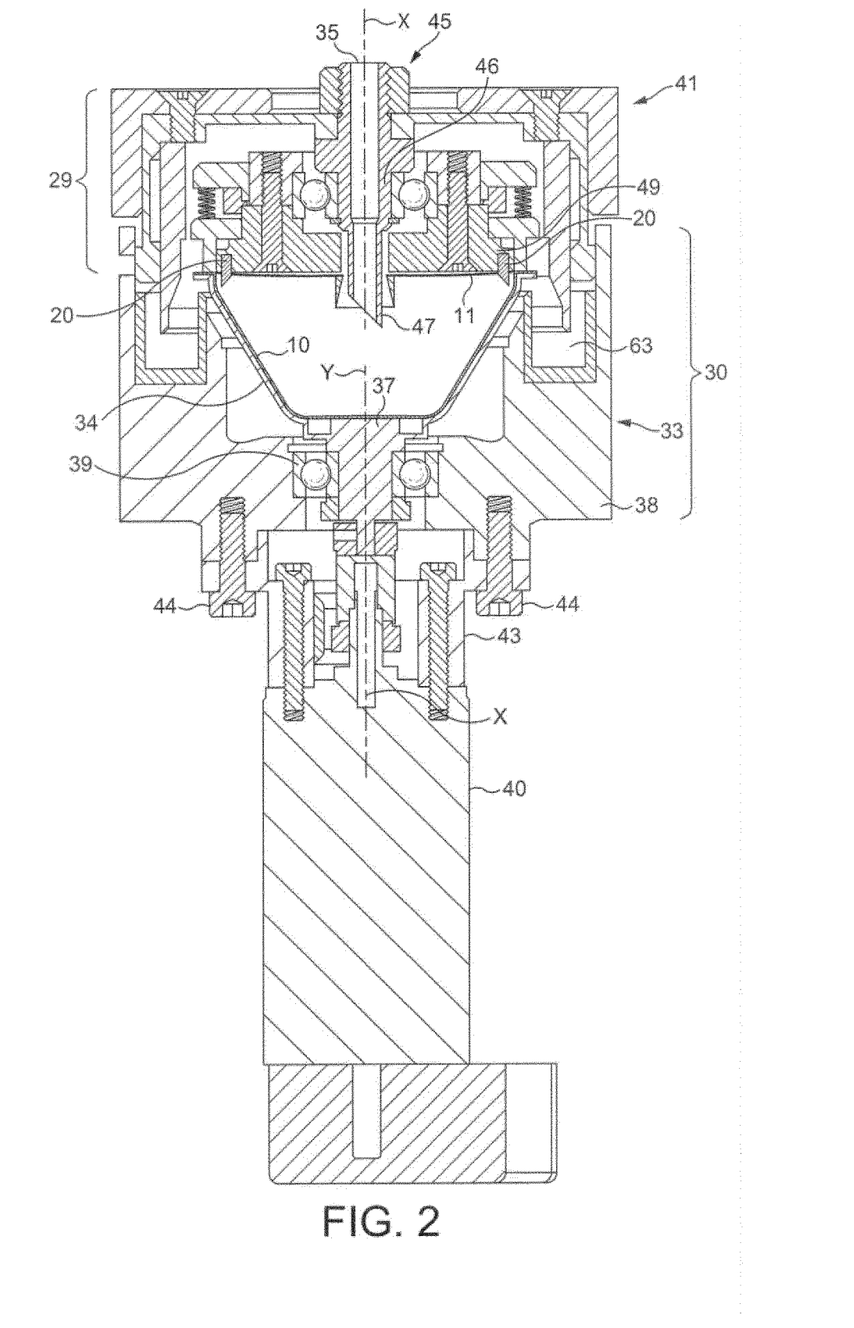
FIG. 2 is a sectional side view of the beverage preparation device according to FIG. 1.

FIG. 1 refers to a system comprising a beverage preparation device 50 according to the invention that comprises a module 41 into which a capsule 10 of the system can be inserted (see FIG. 2). The capsule 10 contains a food substance such as e.g. ground coffee. A suitable capsule for the system is disclosed in WO2010/066736. The capsule is rotational symmetric about a centre axis Y thereof.

The module 41 of the beverage preparation device is in fluid communication with a water supply such as a water reservoir 25. A fluid transport means such as a pump 26 is provided in the fluid circuit 27 between the module 41 and the water supply 25. A water heater 28 is further provided to heat water in the fluid circuit 27 before water enters the module 41. The water heater 28 can be inserted in the fluid circuit 27 to heat fresh water coming from the reservoir 25 or alternatively can be in the water reservoir that becomes a water boiler in such case. Water may also be taken directly from a domestic water supply via a water plug connection.

The water can be fed in the module 41 at low pressure or even at gravity pressure. For example, a pressure of between 0 and 2 bar above atmospheric pressure can be envisaged at the water inlet 35 of the module.

The brewing module 41 of the beverage preparation device 50 comprises enclosing means 29, 30. Thereby, the enclosing means 29, 30 comprise a water injection subassembly or water injection head 29 and a liquid receiving subassembly 30 including a capsule holder in which the capsule 10 may be placed by means of a user (see FIG. 2). The enclosing means 29, 30 are designed for forming positioning and centering means for the capsule 10 in the beverage preparation device 50.

The two enclosing means 29, 30 are designed for being movable relative to each other in order to assume a capsule insertion position (not shown) in which a user may provide the capsule to the receiving subassembly 30 and a capsule enclosing position (shown in FIG. 2) in which the water injection subassembly connects to an upper wall or membrane 11 of the capsule 10.

The liquid receiving subassembly 30 comprises a liquid duct 32, for example, protruding on a side of the subassembly for guiding the centrifuged liquid coming out of the capsule 10 to a receptacle such as a cup or glass.

As show in FIG. 2, the liquid duct 32 is in communication with a liquid receiver 33 forming a cylindrical wall placed at a short distance about a capsule holder formed by a rotating drum 34 into which the capsule 10 is inserted. The liquid receiver defines with the drum 34 an intermediate cavity 63 for collecting beverage being drained from the capsule 10. Below the liquid receiving subassembly 30, driving means 40 for driving the capsule receiving drum 34 in rotation inside the subassembly about a central axis X of the enclosing means 29, 30 are provided. It is noted that when being placed within the device, the central axis Y of the capsule 10 coincides with the central axis X of the enclosing means 29, 30. It should be noticed that the central axis may not necessary be oriented vertically but may be slightly inclined relative to vertical.

The water injection subassembly 29 comprises a water inlet side comprising a water inlet 35 communicating upstream with the water fluid circuit 27.

The rotary drum 34 is preferably shaped as a hollow capsule holder with an internal cavity complementary shaped to receive the capsule 10. The rotary drum 34 prolongs itself axially by a rotating shaft 37 which is maintained in rotational relationship relative to an outer base 38 of the liquid receiver 33 by a rotational guiding means 39 like a ball bearing or needle bearing. The rotary drum 34 is thus designed to rotate around the central axis X, whereas the outer base 38 of the receiver is fixed relative to the device. The liquid receiver 33 can be fixed to a housing 43 of the motor by bolts 44 for example.

The water injection subassembly 29 comprises a centrally arranged water injector 45 which is fixed relative to central axis X of the device. The water injector comprises a central tubular member 46 for transporting water from the inlet 35 to a water outlet 47 that is intended to protrude inside the enclosure of the capsule 10. Thereby, a distal end of the water outlet 47 is preferably formed as puncturing means such as a sharp tubular tip that is able to create a central inlet aperture through the upper membrane 11 of the capsule 10.

About the water injector 45 is mounted a capsule rotary engaging part 49. The engaging part 49 preferably comprises perforating means 20 which protrude from a disc-shaped engaging member 49a (see FIG. 3) into an interior of the device, enclosed by engaging means 29, 30. The disc-shaped engaging member 49a may be integrally formed with the engaging part 49 or may be designed to be selectively connectable to said engaging part 49.

The perforating means 20 are preferably orientated to perforate an upper membrane 11 of the capsule 10 in the capsule enclosing position of the enclosing means 29, 30. Thereby, the perforating means 20 are preferably arranged to provide several openings in the capsule 10 for the centrifuged liquid to leave the capsule forming several streams of liquid that are then collected in the intermediate cavity 63.

Figure 3:
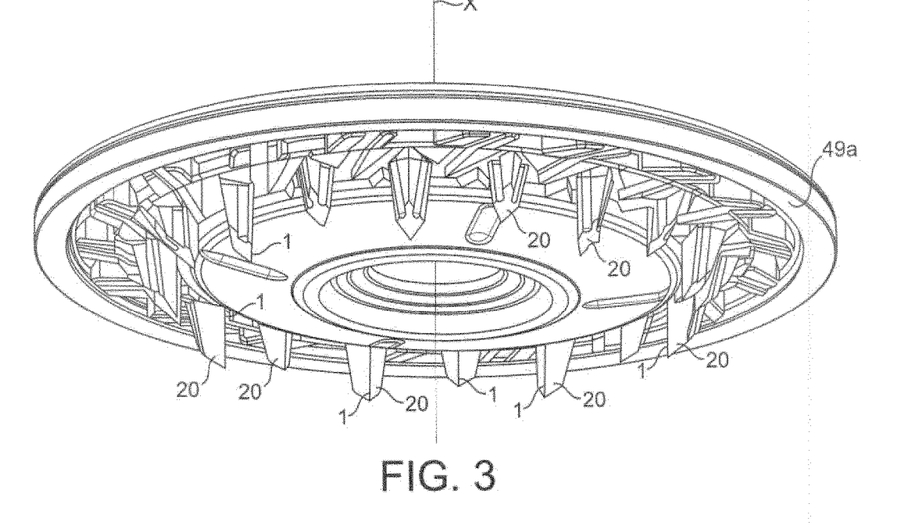
FIG. 3 is a perspective side view of perforating means of the beverage preparation device.

The perforating means 20 preferably comprise at least two perforating members 20. In a preferred embodiment as shown in FIG. 3, the perforating means comprise a multitude of perforating members 20 arranged about the central axis X of enclosing means 29, 30. The perforating members 20 are arranged radially outside of the centre axis X of the enclosing means 29, 30 and protrude from the disc-shaped engaging member 49a.

Each of the perforating members comprises a cutting edge 1, whereby the perforating members 20 are arranged such that the cutting edge 1 is directed towards the centre respectively towards the rotational axis X.

The cutting edge 1 of each of the perforating members 20 is arranged essentially parallel to the centre axis X. Accordingly, when the capsule 10 is placed in the beverage preparation device, the cutting edge 1 is also arranged essentially in parallel to the centre axis Y of the capsule 10.

Figure 5A:
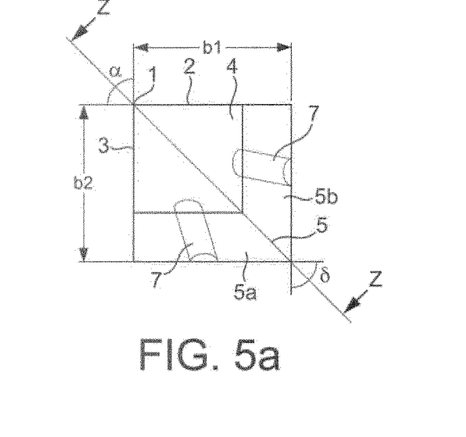

The cutting edge 1 is formed by two cutting surfaces 2,3 which are preferably planar and enclose an angle of α of between 80 and 100°, preferably between 85 and 95°, more preferably between 88 and 92° when seen in top view as shown e.g. in FIG. 5a.

The cutting surfaces 2,3 extend from the cutting edge 1 to a width b1, b2 which is preferably equal. Thereby, the width b1, b2 is preferably between 0.5 and 5 mm, more preferably between 1 and 4 mm.

Figure 4:
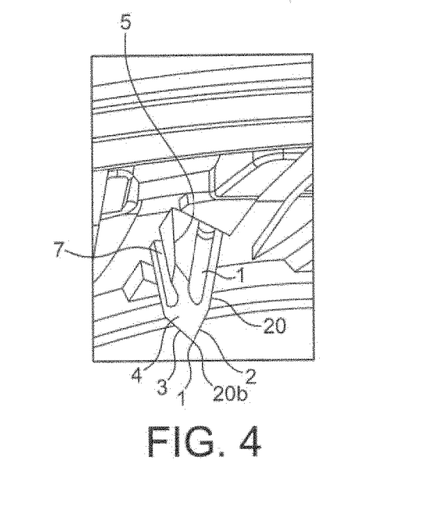
FIG. 4 is a perspective side view of a preferred embodiment of a single perforating member of the perforating means according to the invention.

The perforating member 20 further comprise a displacement portion 4 designed for displacing a portion of a membrane 11 of the capsule 10 towards a side of the perforating member 20 essentially opposite of the cutting edge 1 upon contact with the membrane 11.

Figures 5B, 6:
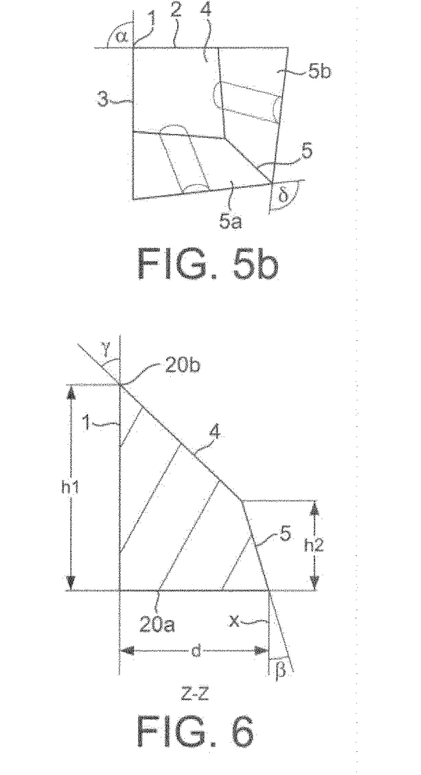
Figure 7:
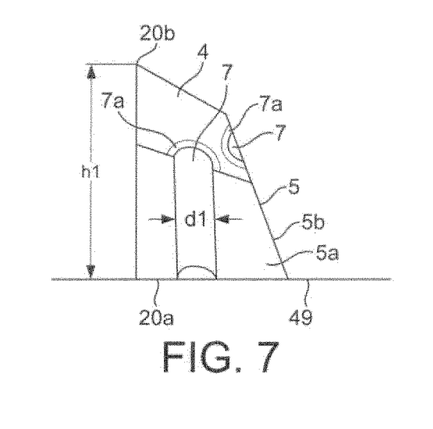
FIG. 7 is a perspective side view of a preferred embodiment of a perforating member.

As shown in FIGS. 6 and 7, the displacement portion 4 is arranged to connect a protruding distal portion 20b of the cutting edge 1 with a collecting portion 5 of the perforating member 20.

Preferably, the displacement portion 4 is a planar surface arranged at an acute angle γ of between 5 to 45°, preferably between 10 to 25°, more preferably between 15 to 20° relative to the cutting edge 1.

The collecting portion 5 is arranged at the essentially opposite side of the perforating member 20 with respect to the cutting edge 1.

Figure 5C:
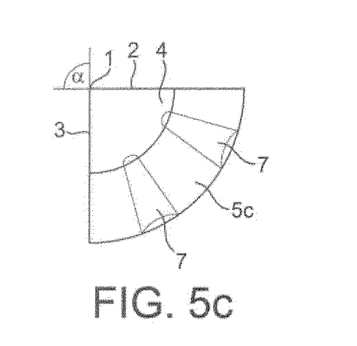

The collecting portion 5 may be formed by an outwardly convex outer surface 5a as shown in FIG. 5c or by at least two joint surfaces 5a, 5b as indicated in FIGS. 5a, 5b. Thereby, the two joint surfaces 5a, 5b enclose an angle δ which is preferably 90° as indicated in FIG. 5a. In another preferred embodiment, the angle δ is preferably between 65 and 120°, more preferably between 80 and 100° (see e.g. FIG. 5b).

The outer surface 5a, 5b, 5c of the collecting portion 5 encloses an angle β of between 2 to 20°, more preferably 5 to 15° with the central axis X of the enclosing member 29, 30.

The perforating member 20 extends to a height h1 from its base portion 20a connected to the disc-shaped engaging member 49a into the interior of the enclosing means 29, 30. The height h1 is preferably between 2 and 15 mm, more preferably between 3 and 12 mm. Thereby, the cutting edge 1 extends from the base portion 20a to a distal portion 20b of the perforating member 20.

The collecting portion 5 which is arranged preferably essentially opposite to the cutting edge 1 extends from the base portion 20 to a height h2 which preferably lies between 0.5 and 10 mm, more preferably between 1 and 7 mm.

The diameter d of the perforating member 20 as indicated in sectional side view of FIG. 6 preferably lies between 1 and 6 mm, more preferably between 2 and 5 mm.

Optionally, the perforating member 20 comprises pressure release means 7 that extend from the base portion 20a of the perforating member 20 towards the displacement portion 4.

The pressure release means is preferably at least one recess formed essentially parallel to the cutting edge 1 of the perforating member 20. Thereby, the pressure release means is preferably formed in the outer surface 5a, 5b, 5c of the collecting portion 5. Accordingly, the pressure release means preferably extend from the base portion 20a of the perforating member 20 to the vicinity of the joint surface of the collecting portion 5 and the displacement portion 4.

The recess 7 forming the pressure release means may be of semicircular or rectangular shape when seen in top view. Thereby, the diameter of the recess 7 d1 may be constant throughout the extension of the recess through the perforating member 20. The diameter d1 may as well increase or decrease from the base portion 20a towards the distal portion 20b of the perforating member 20. The recess 7 may as well be chamfered at the portion of intersection with the displacement portion 4 as indicated by the dotted lines 7a in FIG. 7.

The perforating member 20 is preferably provided with two pressure release means 7 as shown in FIGS. 5a, 5b, 5c, 7. However, in another preferred embodiment, the perforating member 20 may comprise at least two or three recesses formed in the vicinity of the displacement portion 4.

Although the present invention has been described with reference to preferred embodiments thereof, many modifications and alternations may be made by a person having ordinary skill in the art without departing from the scope of this invention which is defined by the appended claims. For example, the invention can apply to a method in which the capsule is not rotated around the centre axis but liquid is forced through the capsule via fluidic forces exerted solely by a pump and/or gravity.

The invention claimed is:

1. A beverage production device for preparing a beverage by extracting a food substance contained in a capsule, the beverage production device comprising:
a capsule enclosing member configured to house the for housing a dedicated capsule within the beverage production devices;
a water supply member configured to provide for providing liquid to the capsule enclosing member; and
perforating members member provided within the capsule enclosing member and configured to perforate the capsule to produce outlet openings in the capsule for guiding the beverage out of the capsule, each of the perforating members comprising a cutting edge formed by two outer cutting surfaces joined at the cutting edge, the cutting edge is arranged essentially parallel to a vertical central axis of the capsule enclosing member, and the perforating members are arranged such that the cutting edge is directed towards the vertical central axis of the capsule enclosing member;
wherein the perforating members each comprise a side essentially opposite of the cutting edge and further comprise a displacement portion designed for displacing a portion of a membrane of the capsule towards the side of the corresponding perforating member upon contact with the membrane;
wherein the perforating members each comprise a collecting portion arranged at the side essentially opposite to the cutting edge, and the displacement portion connects a protruding distal portion of the cutting edge with the collecting portion.

2. The beverage production device of claim 1, wherein the capsule enclosing member is arranged to rotate around the vertical central axis for driving the capsule in rotational centrifugation.

3. The beverage production device of claim 1, wherein the two outer cutting surfaces are planar.

4. The beverage production device according to claim 1, wherein the two outer cutting surfaces forming the cutting edge are joined at an angle between 25 and 100°.

5. The beverage production device according to claim 1, wherein the perforating members each comprise a base portion and member comprises the collecting portion extending from the a-base portion of the perforating member to a first height smaller than the-a second height to which the cutting edge extends from the base portion.

6. The beverage production device according to claim 5, wherein the collecting portion is formed by a curved outer surface or at least two joint surfaces.

7. The beverage production device according to claim 5, wherein an outer surface of the collecting portion encloses an angle of between 2 to 45° with the central axis of the capsule enclosing member.

8. The beverage production device according to claim 5, wherein an outer surface of the collecting portion has a shape selected from the group consisting of circular, ellipsoidal, and polygonal.

9. The beverage production device according to claim 1, wherein the perforating members are distributed regularly in an off-centered arrangement about the central axis of the capsule enclosing member.

10. The beverage production device according to claim 1, wherein a first perforating member of the perforating members comprises a pressure release member comprising at least one recess essentially parallel to the cutting edge of the first perforating member.

11. The beverage production device according to claim 10, wherein the at least one recess has a diameter selected from the group consisting of (i) constant throughout extension of the at least one recess through the first perforating member, (ii) that increases from a base portion of the first perforating member towards a distal portion of the first perforating member, and (iii) that decreases from the base portion towards the distal portion of the first perforating member.

* * * * *